No. 896,638. PATENTED AUG. 18, 1908.
H. W. HOCK.
APPARATUS FOR CLEANING SKELP.
APPLICATION FILED MAR. 27, 1908.
3 SHEETS—SHEET 2.
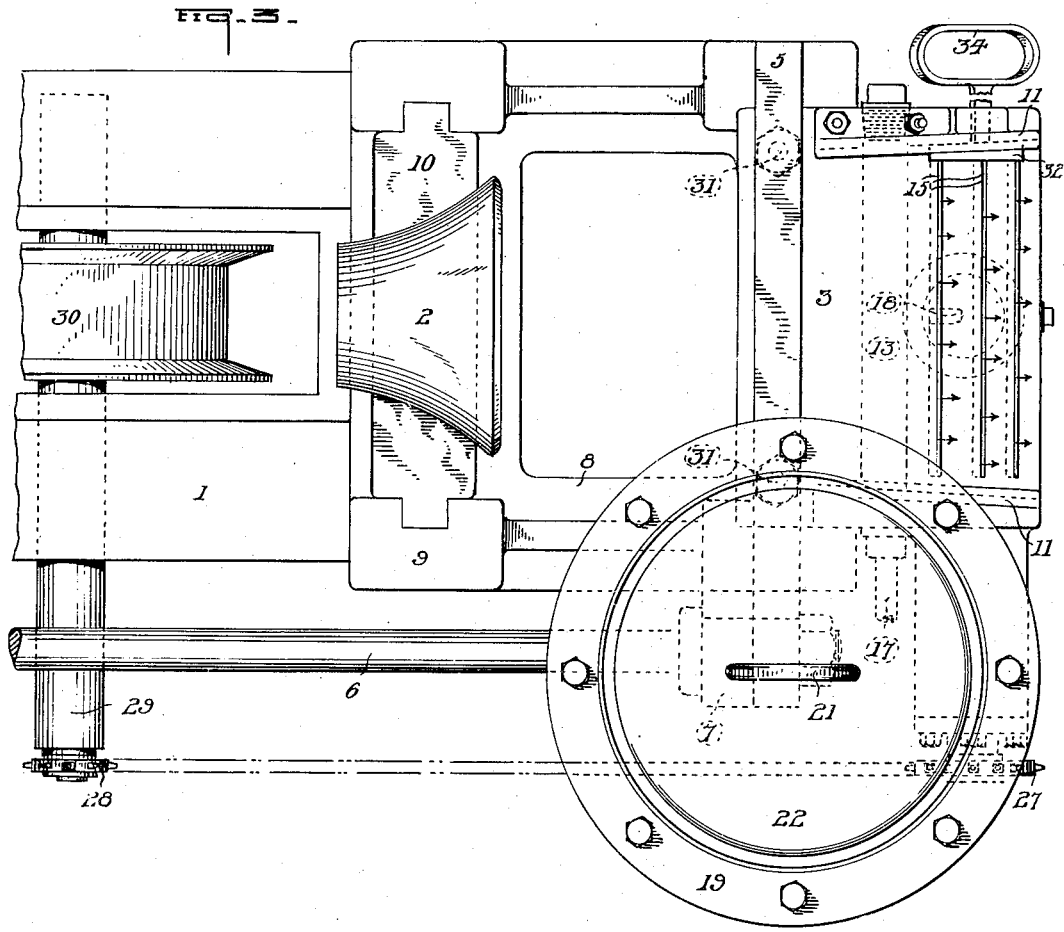
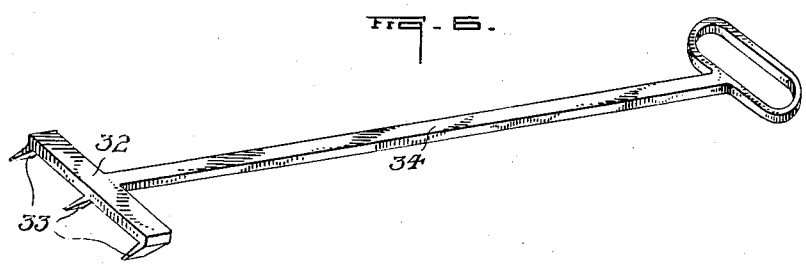
WITNESSES:
INVENTOR
H. W. Hock
by F. N. Barber
ATTORNEY No. 896,638. PATENTED AUG. 18, 1908.
H. W. HOCK.
APPARATUS FOR CLEANING SKELP.
APPLICATION FILED MAR. 27, 1908.
3 SHEETS—SHEET 3.
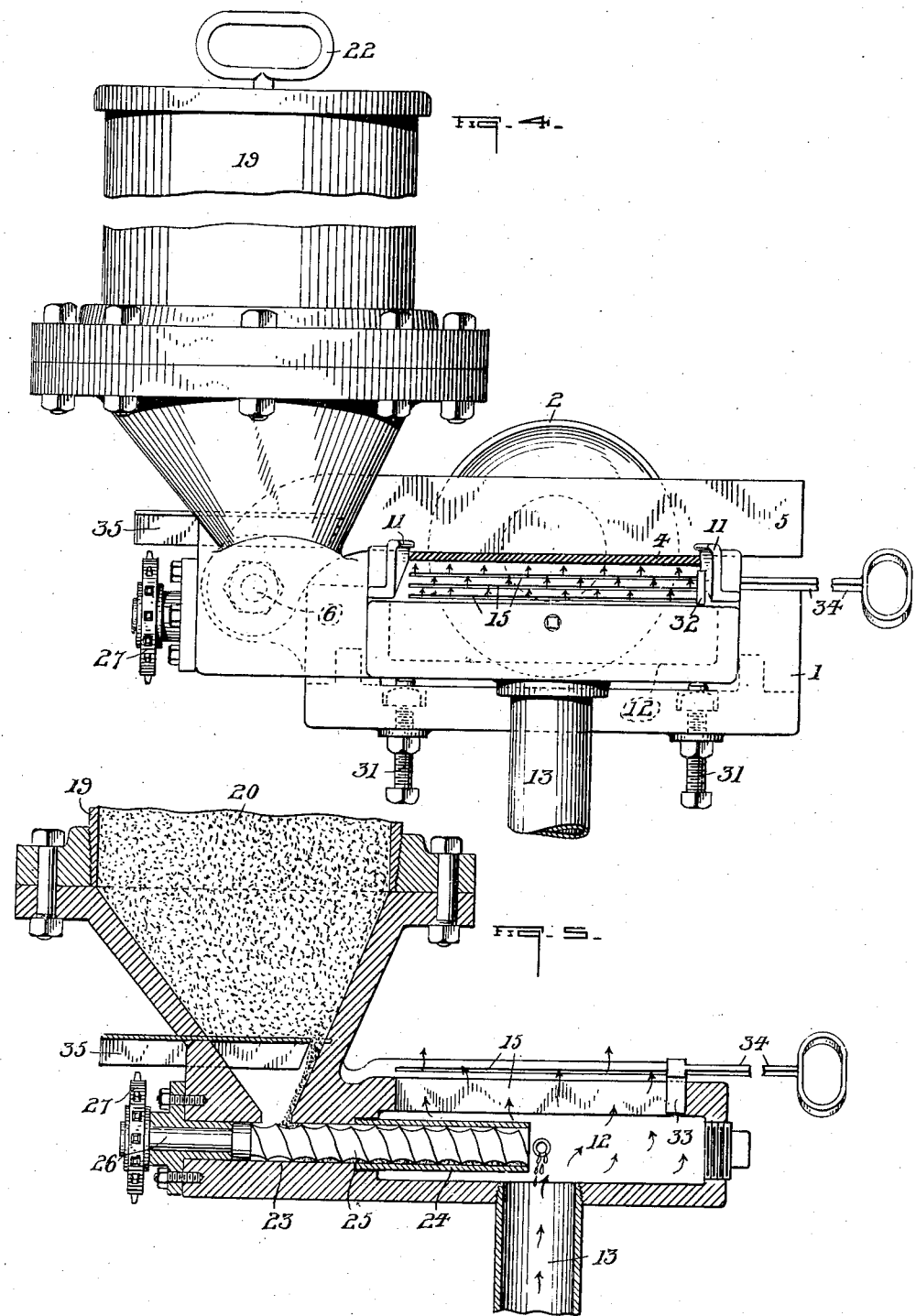
WITNESSES:
INVENTOR
H. W. Hock
by F. N. Barber
ATTORNEY

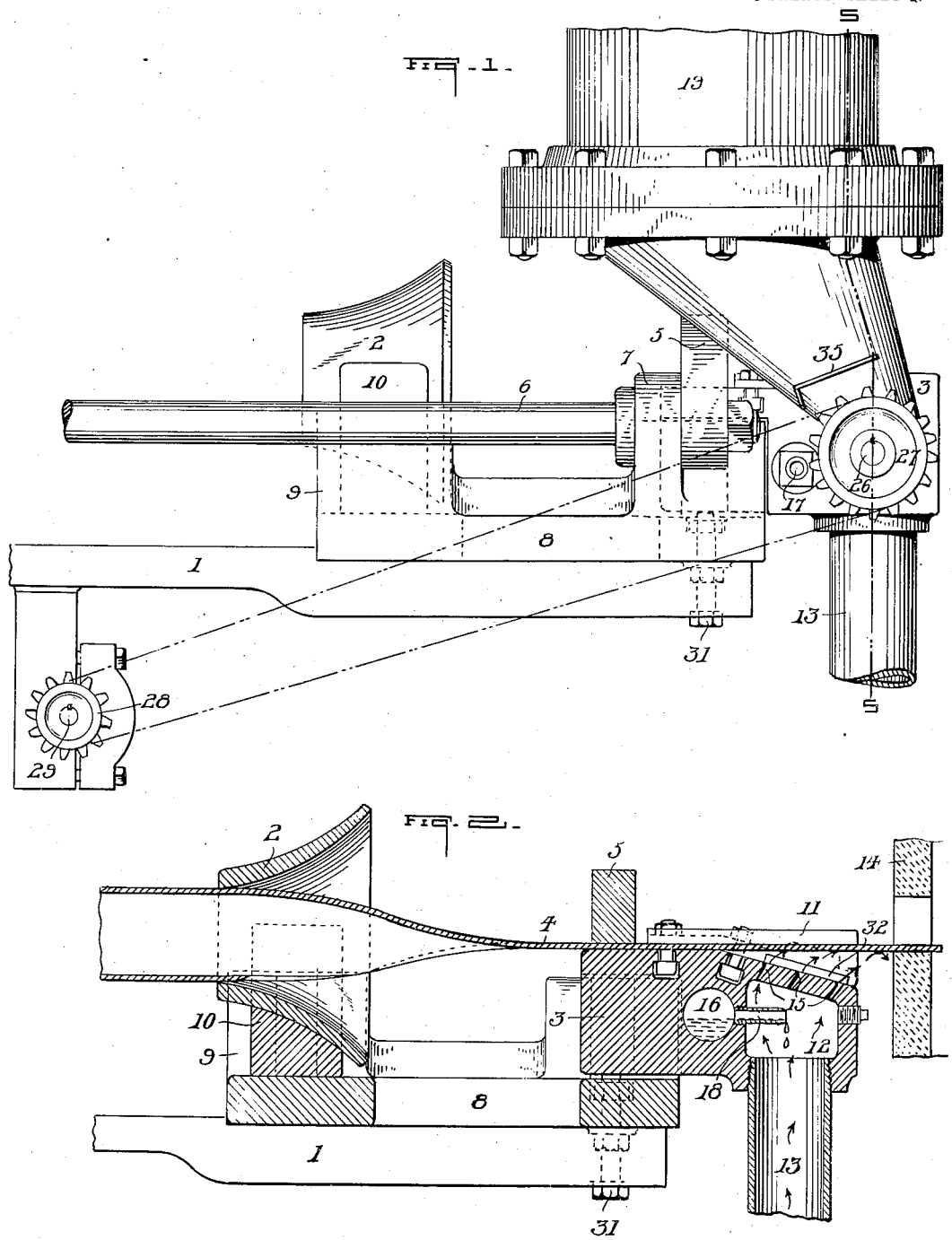

UNITED STATES PATENT OFFICE.

HENRY W. HOCK, OF YOUNGSTOWN, OHIO, ASSIGNOR TO THE YOUNGSTOWN SHEET AND TUBE COMPANY, OF YOUNGSTOWN, OHIO, A CORPORATION OF OHIO.

APPARATUS FOR CLEANING SKELP.

No. 896,638.          Specification of Letters Patent.         Patented Aug. 18, 1908.

Application filed March 27, 1908. Serial No. 423,709.

*To all whom it may concern:*

Be it known that I, HENRY W. HOCK, a citizen of the United States, residing at Youngstown, in the county of Mahoning and State of Ohio, have invented or discovered new and useful Improvements in Apparatus for Cleaning Skelp, of which the following is a specification.

My invention has relation to apparatus for cleaning the concave or under side of skelp immediately before it reaches the welding bell or other welding device.

It is the object of my invention to provide the pipe-welding draw-bench, or its equivalent, with means for treating the surface of skelp just before it enters the welding bell, or its equivalent, so as to remove scale, dirt, and other impurities. Preferably, I use a mixture of borax, sand, and water which is blown against the skelp as it passes to the welding bell, but other cleaning agents may be used, or some of those named may be omitted.

Referring to the drawings illustrating one of the many forms which my invention may assume, Figure 1 is a side elevation of the front end of a draw-bench equipped with my invention; Fig. 2, a vertical longitudinal view of the same; Fig. 3, a plan of Fig. 1; Fig. 4, a front elevation of Fig. 1, showing the skelp in section; Fig. 5, a vertical section of Fig. 1 on the line 5—5; and Fig. 6, a perspective of the rake for cleaning the exit slots on the blast box.

On the drawings, 1 represents the forward end of a draw-bench, which supports the usual welding bell 2. The draw-bench carries the block 3 situated in front of the bell 2. The skelp 4 slides on this block on which it is pressed by means of the oscillatory tension bar 5 carried by the rock-shaft 6, operated in any desired manner. The shaft 6 is journaled on the lug 7 supported by the draw-bench or on the forward extension 8 of the bell-block support 9, which carries the bell-holder 10.

The block 3 is provided in front of the tension-bar 5 with the guides 11, one to guide each edge of the skelp 4. The extreme front end of the block 3 contains the blast-chamber 12, which is at least as long transversely of the draw-bench as the skelp is wide. The chamber is supplied with air by means of the vertical pipe 13, connected to any suitable source of air pressure. The top of the block 3 is inclined downwardly toward the skelp-heating furnace 14, causing a wedge shape space to exist between the skelp and the front end of the block. In the inclined portion of the block 3 I place a number of slots 15 extending transversely of the skelp 4 or the draw-bench 1, the slots having their length about equal to the width of the skelp. I have shown three slots 15 inclined upwardly toward the furnace, the slots being preferably more inclined as they lie nearer the furnace in order to cause the blast to impinge on the skelp at different angles and to escape with the least interference of currents.

The block 3 has the transverse opening or chamber 16 at the rear of the chamber 12 to receive water, which is admitted through the pipe 17. Water is brought in to the chamber 12 and over the center of the pipe 13 by the tube 18.

The block 3 supports the hopper 19 which contains sand, borax, or both or other cleaning or abrasive material 20. The hopper is provided with the cover 21 which is provided with the ring 22 for removing it. The lower end of the hopper communicates with the passage 23 which may open directly into the chamber 12, but is preferably continued by the pipe 24 to the center of the chamber over the pipe 13 or as near thereto as the pipe 18 will permit. Within the passage 23 and the pipe 24 is the feed-screw 25. The shaft 26 of the feed-screw is provided with the sprocket-wheel 27 which is driven from the sprocket-wheel 28 on the shaft 29, the latter being the shaft carrying the usual wheel 30 on the draw-bench for supporting and guiding the draw-chain (not shown).

The block 3 is adjusted vertically by the screws 31 which extend up through the front end of the draw-bench into engagement with the bottom of the block.

The slots 15 are cleaned by the rake-shaped tool shown in Fig. 6. It has the head 32 which is provided with the teeth 33, extending into the said slots 15. The head is operated by the long handle 34, by which it may be pushed to cause the teeth to clean the said slots thoroughly.

The flow of material from the hopper 19 may be regulated by the gate 35. As the skelp passes over the block 3 it is attacked on the under side by the sand, borax, and water or other material blown through the slots 15 and thoroughly cleaned before it enters the welding-bell 2. The blast from the slots being opposite the direction which the skelp moves blows all the scale and other impurities away from the skelp, so that they will not be drawn along with the skelp.

I claim—

1. In a pipe-welding apparatus, a welding-furnace, a welding-bell, a blast-chamber between the furnace and the bell, said chamber having one or more openings arranged so as to direct cleaning material from the chamber against the under side of the skelp.

2. In a pipe-welding apparatus, a welding-furnace, a welding-bell, and a blast-chamber between the welding-bell and the furnace and below the line of feed of the skelp, said chamber having one or more openings arranged to direct the cleaning material against the entire width of the skelp.

3. In a pipe-welding apparatus, a welding-furnace, a welding-bell, a blast-chamber between the furnace and the bell, said chamber having one or more openings inclined toward the furnace, and arranged so as to direct the cleaning material from the chamber against the under side of the skelp.

4. In a pipe-welding apparatus, a welding-furnace, a welding-bell, a blast-chamber between the furnace and the bell, said chamber having a plurality of openings inclined at different angles toward the furnace, and arranged so as to direct the cleaning material from the chamber against the under side of the skelp.

5. In a pipe-welding apparatus, a welding-furnace, a welding-bell, a blast-chamber between the furnace and the bell and below the line of the feed of the skelp, said chamber having one or more slots in its upper wall extending transversely of said line of feed, and a handle having a finger in each slot for cleaning the same.

6. In a pipe-welding apparatus, a welding-furnace, a welding-bell, a blast-chamber located between said furnace and bell and having one or more openings arranged to direct the material from said chamber against the under side of the skelp, and means for leading the cleaning material into said chamber.

7. In a pipe-welding apparatus, a welding-furnace, a welding-bell, a blast-chamber located between said furnace and bell and having one or more openings arranged to direct material from said chamber against the under side of the skelp, and means for leading water into the said chamber.

8. In a pipe-welding apparatus, a welding-furnace, a welding-bell, a blast-chamber located between said furnace and bell and having one or more openings arranged to direct material from said chamber against the under side of the skelp, and means for leading water and a cleaning material into said chamber.

Signed at Pittsburg, Penna., this 26th day of March, A. D. 1908.

HENRY W. HOCK.

Witnesses:
ALICE E. DUFF,
F. N. BARBER.